P. E. Tiernan,
Pound Net.
No. 113,817. Patented Apr. 18, 1871.
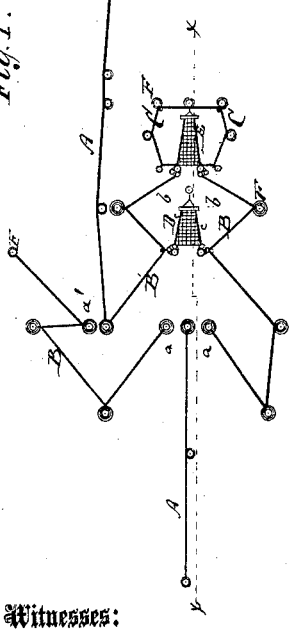
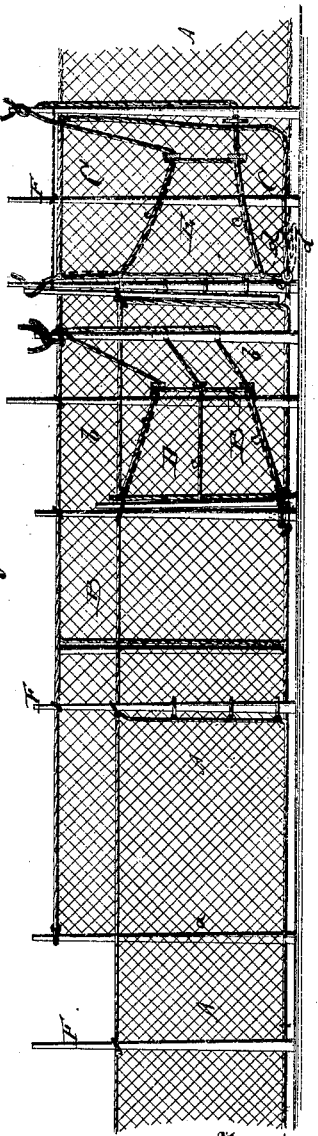
Witnesses:
E. Wolff
Wm H. C. Smith.
Inventor:
P. E. Tiernan.
PER
Attorneys.

UNITED STATES PATENT OFFICE.

PATRICK E. TIERNAN, OF WAUKEGAN, ILLINOIS.

IMPROVEMENT IN POUND-NETS FOR FISHING.

Specification forming part of Letters Patent No. 113,817, dated April 18, 1871.

*To all whom it may concern:*

Be it known that I, PATRICK E. TIERNAN, of Waukegan, in the county of Lake and State of Illinois, have invented a new and Improved Pound-Net; and I do hereby declare that the following is a full, clear, and exact description thereof, which will enable others skilled in the art to make and use the same, reference being had to the accompanying drawing, forming part of this specification, in which—

Figure 1 represents a plan view of my improved pound-net. Fig. 2 is a longitudinal section, on an enlarged scale, of the same, taken on the plane of the line $x\ x$, Fig. 1. Fig. 3 is a detail vertical section on the plane of a line, $y\ y$, Fig. 1.

Similar letters of reference indicate corresponding parts.

This invention relates to a new pound-net to be used in rivers or lakes, for continually arresting and retaining fish of proper growth and size, and absolutely preventing their escape when once within the pound.

The main object of the invention is to provide a secondary pound or fish-receptacle, which will be in action while the main pound is being drawn up to be emptied, and thereby prevent the escape of fish from the "heart" of the net.

Pound-nets are at present made substantially as follows: Each net consists of a leader, a heart, and a pound, and is held in place by vertical piles driven into the ground. The leader is an upright net, extending from the shore into the water, constituting a transverse barrier for the fish. The heart is a double-winged cavity, formed by a peculiar position of the net-wall. Into it the fish are led by passing along the leader. From the heart leads a funnel-shaped opening to and into the pound, which pound is an upright bag let into the water. The pound is that part of the net from which the fish are taken by being hoisted out of the water and emptied into a boat. The pound, when lowered, extends above the surface of the water, so that the fish cannot escape over its rim. After having been emptied the pound is again let down to be refilled by fish entering it from the heart.

While the pound is elevated the funnel from the heart is opened and the fish in the latter can all escape; and even were the funnel closed during said time, the fish would attempt to escape, and succeed by going back toward the leader, which they are apt to do when finding the front closed. In the old nets, where two or more were stretched across one river or lake, the leader of one net was made to butt against the heart or pound of the next. Thereby but one direction of swimming brought the fish into the side opening of the heart. In the other direction they would strike against the closed heart or pound. All these objections are overcome by the several features of my invention.

A in the drawing represents the leader of my net. B is the heart, formed by a peculiar placing of the nets so as to have entrance-openings $a\ a$ at both sides of the leader. C is the pound.

The heart forms a chamber, $b$, nearest the pound, and the connections between the outer part of the heart and said chamber are obtained by means of a horizontal funnel, D.

The funnel is largest at the outer end, and contracts toward the chamber $b$, and is braced by ropes $c\ c$ at the sides, to prevent it from bagging with a current. This funnel will cause the chamber $b$ to be a secure receptacle for fish. Another funnel, E, leads from the chamber $b$ of the heart to the pound C, it forming part of said pound.

The pound can be raised in the ordinary manner, and is connected with a piece, $d$, of netting, which it draws over the opening for the funnel E in the chamber $b$ when elevated, so as to close said chamber safely. The chamber $b$ will then serve to retain the fish while the pound is out of action, the funnel D preventing their escape from $b$. When the pound is let down the net $d$ folds under it.

The funnel E is also braced with ropes $c$, like the funnel D. This bracing permits the use of large funnels, which will not cause as many fish to turn back as are now lost by the small funnels.

The nets herein referred to are secured to piles F, which are driven in the ground.

The pound is secured to weighted rings $e\ e$, which slide on the piles, as shown in Fig. 3.

When two or more of my nets are used, as in Fig. 1, I carry the leader of one net directly into the heart of the other, so that thereby an opening, $a'$, will be formed, providing an entrance at each end of the leader into the heart, as is clearly shown in Fig. 1.

Having thus described my invention, I claim as new and desire to secure by Letters Patent—

1. The folding net $d$, combined with the vertically-adjustable pound C, to close the opening in the heart when the pound is elevated, as specified.

2. The heart B, provided with the openings $a'$, combined with the leader A, so that there is an opening at each end of the leader, as set forth.

PATRICK E. TIERNAN.

Witnesses:
 WILLIAM A. MELODY,
 GEO. FERGUSON.